(12) United States Patent
Hoffmann et al.

(10) Patent No.: US 9,557,722 B1
(45) Date of Patent: Jan. 31, 2017

(54) SELF-STABILIZING SYSTEM FOR MULTIPLE INTERACTING CONTROLLERS

(75) Inventors: Heiko Hoffmann, Simi Valley, CA (US); David W. Payton, Calabasas, CA (US)

(73) Assignee: HRL Laboratories, LLC, Malibu, CA (US)

(*) Notice: Subject to any disclaimer, the term of this patent is extended or adjusted under 35 U.S.C. 154(b) by 960 days.

(21) Appl. No.: 13/567,989

(22) Filed: Aug. 6, 2012

(51) Int. Cl.
| | |
|---|---|
| *G01B 13/02* | (2006.01) |
| *G01K 7/42* | (2006.01) |
| *G05B 13/02* | (2006.01) |

(52) U.S. Cl.
CPC ............ *G05B 13/02* (2013.01); *G05B 13/024* (2013.01); *G01K 7/42* (2013.01)

(58) Field of Classification Search
None
See application file for complete search history.

(56) References Cited

U.S. PATENT DOCUMENTS

| | | | | |
|---|---|---|---|---|
| 3,755,726 A | * | 8/1973 | Knipe .................... | B23Q 15/00 318/563 |
| 4,071,886 A | * | 1/1978 | Eicher ............................. | 700/28 |
| 4,592,320 A | * | 6/1986 | Peter .................... | G05B 13/025 123/339.17 |
| 4,677,542 A | * | 6/1987 | Kasten ................ | A01B 63/1117 172/9 |
| 4,710,864 A | * | 12/1987 | Li ......................... | G06N 99/005 700/32 |
| 5,042,752 A | * | 8/1991 | Surauer et al. ............... | 244/164 |
| 5,173,649 A | * | 12/1992 | Wise ........................ | G05B 5/01 318/611 |
| 5,179,511 A | * | 1/1993 | Troyk ................... | H02M 3/156 323/222 |
| 5,479,090 A | * | 12/1995 | Schultz ........................ | 323/284 |

(Continued)

OTHER PUBLICATIONS

A Hubler. K Phelps, "Guiding a self-adjusting system through chaos," Complexity, Special Issue: Complex Systems Engineering, 13(2), 62-66, 2007.

(Continued)

*Primary Examiner* — Mohammad Ali
*Assistant Examiner* — Kelvin Booker
(74) *Attorney, Agent, or Firm* — Tope-McKay & Associates

(57) ABSTRACT

Described is a control system for stabilizing complex systems through self-adjustment. The complex system consists of agents or machines interacting with an environment and controlled by a controller. The control system includes a sensor configured to measure a state of the complex system and output the measured state of the complex system. A filter receives the measured state of the complex system, computes a variance in the measured state of the complex system over time, and outputs the computed variance. A regulator, which is connected with at least one controller, adjusts a control parameter in response to the computed variance received from the filter. The regulator is configured to regulate each controller's action on each agent or machine based on the control parameter in order to maintain stability of the complex system. In a desired aspect, the at least one control parameter comprises a set of additional input delays.

15 Claims, 7 Drawing Sheets

(56) References Cited

U.S. PATENT DOCUMENTS

| | | | |
|---|---|---|---|
| 6,983,227 B1* | 1/2006 | Thalhammer-Reyero | G05B 17/02 345/419 |
| 7,258,307 B2* | 8/2007 | Enzinger et al. | 244/195 |
| 2002/0036989 A1* | 3/2002 | Payton | 370/254 |
| 2002/0094780 A1* | 7/2002 | Payton et al. | 455/41 |
| 2002/0138179 A1* | 9/2002 | Payton et al. | 701/1 |
| 2003/0233211 A1* | 12/2003 | Payton et al. | 702/150 |
| 2006/0015222 A1* | 1/2006 | Payton et al. | 701/19 |
| 2006/0195229 A1* | 8/2006 | Bell | H02J 3/00 700/286 |
| 2006/0225737 A1* | 10/2006 | Iobbi | 128/204.21 |
| 2007/0247303 A1* | 10/2007 | Payton | 340/524 |
| 2008/0297065 A1* | 12/2008 | Mubaslat | B64D 27/04 315/291 |
| 2010/0121314 A1* | 5/2010 | Iobbi | 604/890.1 |
| 2012/0223687 A1* | 9/2012 | Liu et al. | 323/271 |
| 2013/0002147 A1* | 1/2013 | Lagutko | H05B 37/0218 315/158 |
| 2013/0184838 A1* | 7/2013 | Tchoryk, Jr. | G05B 13/042 700/31 |
| 2014/0067740 A1* | 3/2014 | Solari | 706/27 |

OTHER PUBLICATIONS

P Melby P. N Weber, A Hübler, "Dynamics of self-adjusting systems with noise." Chaos, 15(3):33902, 2005.

\* cited by examiner

SELF-STABILIZING SYSTEM FOR MULTIPLE INTERACTING CONTROLLERS

BACKGROUND OF THE INVENTION (1) Field of Invention

The present invention relates to a control system for stabilizing complex systems, and more particularly, to a control system for stabilizing complex systems through self-adjustment.

(2) Description of Related Art

A control system is a device (or set of devices) which manages, commands, directs, or regulates the behavior of other devices or systems. The state of the art in controlling complex systems splits the problem into modules, then uses either human supervision to set global control variables, such as Supervisory Control and Data Acquisition (SCADA), or tries to abstract the modules to model them analytically, such as with Composition and Abstraction. SCADA uses self-adaptation of controllers, but requires human intervention. Composition and Abstraction methods rely on a sufficiently accurate model of the system and its interaction with the environment. In doing so, it can be assured that software errors are detected early in development. Thus, the behavior of the system can be made to match the model. However, there is no formal way to assure that the models are complete or correct. Furthermore, the models must be abstracted to scale with complexity. This abstraction means that there is no formal assurance that the choices made in abstraction are valid.

Thus, a continuing need exists for an approach to controlling complex systems which avoids the need for human intervention and also compensates for unforeseen modeling errors.

SUMMARY OF THE INVENTION

The present invention relates to a control system for stabilizing complex systems. The complex system comprises a plurality of agents or machines interacting with an environment, each agent or machine controlled by a controller. The control system comprises at least one sensor, connected with at least one of each agent or machine and the environment, configured to measure a state of the complex system and output the measured state of the complex system. At least one filter is configured to receive the measured state of the complex system, compute a variance in the measured state of the complex system over time, and output the computed variance. Additionally, at least one regulator, connected with at least one controller, is configured to automatically adjust a control parameter in response to the computed variance received from the at least one filter. Finally, the at least one regulator is configured to regulate each controller's action on each agent or machine based on the control parameter in order to maintain stability of the complex system.

In another aspect, the at least one regulator comprises a global regulator and a plurality of local regulators regulated through the global regulator, wherein the global regulator adjusts a global variable $d_t$ according to the following:

$$d_{t+1} = \exp(-av_t)d_t + bv_t,$$

where a and b are constants, $v_t$ represents the computed variance, and exp denotes an exponential term that stabilizes $d_t$.

In another aspect, the global variable regulates the control parameter according to the following:

$$\Delta_i = id_t,$$

wherein i is an index that labels each controller.

In another aspect, the control parameter is at least one delay.

In another aspect, the at least one regulator is a plurality of local regulators, each connected with a controller for controlling each agent or machine, and the at least one filter comprises a plurality of filters, wherein each filter is configured to output the computed variance to each local regulator.

In another aspect, the control parameter changes randomly with an amplitude that is proportional to the computed variance.

As can be appreciated by one in the art, the present invention also comprises a method for performing the acts described herein.

Finally, the present invention also comprises a computer program product comprising computer-readable instruction means stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
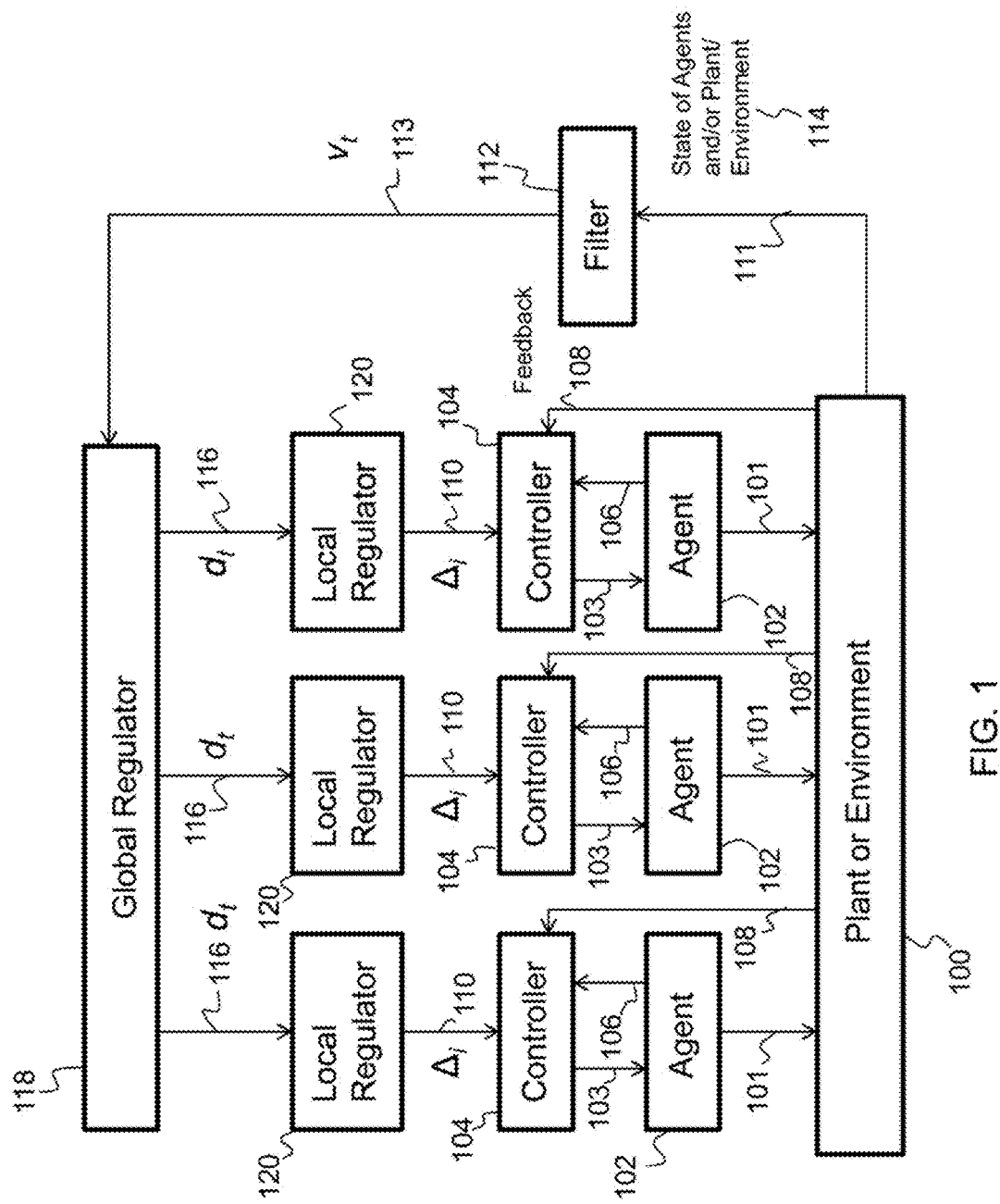
FIG. 1 is a flow diagram depicting a first embodiment of a control system for stabilizing a complex system through self-adjustment according to the present invention.

The present invention relates to a control system for stabilizing complex systems and more particularly, to a control system for stabilizing complex systems through self-adjustment. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) Principal Aspects

The present invention has three "principal" aspects. The first is a control system for stabilizing complex systems. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for stabilizing complex systems. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a non-transitory computer-readable medium such as a floppy disk, a CD-ROM, and a flash drive.

(2) Specific Details

The present invention is a system, method, and computer program product for stabilizing a system of interacting components (e.g., cars on a street, robots collaborating) which make up a complex system. Unexpected and catastrophic failures increase with complexity of a system. In addition, complex systems cannot be modeled completely analytically; modeling the interactions with the environment is often infeasible. Thus, there is a need to compensate for such unmodeled interactions. The present invention enables existing systems with established controllers to be made adaptable such that control parameters can be automatically adjusted to maintain stable behavior in the complex system.

The invention builds upon a given system of components (e.g., agents, robots) and their local control mechanisms. In the context of this application, an agent is an entity which observes through sensors and acts upon an environment. For instance, an agent may be a computer software program which carries out tasks on behalf of a user. A device (e.g., filter) measures the system's oscillations, evaluates the power of these oscillations, and feeds the result to a mechanism that automatically adjusts system parameters. In a desired aspect, these parameters are additional input delays. As a result, the system oscillations make these parameters wander until the oscillations vanish, and the system is stable. The present invention expands prior theoretical work on self-adaptation to stabilize multiple interacting components. Insertion of extra delays is used to obtain stability, and the adjustment of these delays is based on a theory of self-adjusting systems and self-stabilizing control to make a system more robust against instability due to delays or unmodeled dynamics.

As described above, a purpose of the invention described herein is to enable a set of interacting, or coupled, controllers to self-adapt to keep the overall system out of instability. For instance, cars and planes grow increasingly more complex with thousands of electronic components interacting. Automated cruise control is a non-limiting example of a potential application of the present invention. There exists a growing interest in automated cruise control, which in the future will involve variable speed control based on what is occurring around the car (i.e., its environment). For automated cruise control, a smart system is needed to cope with the diversity of systems on the street and the uncertainty due to other human drivers. Here, automatically regulating the speed in dense freeway traffic is an unsolved problem. The current invention offers the potential to help with such problems by contributing to the adaptation of automatic speed controls in such a way that larger-scale interactions become more stable.

The approach described herein is founded on three key elements. The first element is a theory of adaptation to the edge of chaos. The second element is a concept for using this theory to adapt control parameters of a set of interacting agents (components) in such a way that control instabilities cancel each other out. The third element is the discovery that added input delays could function as such parameters to cancel instabilities.

In the theory of adaptation to the edge of chaos, it has been shown how a dynamical system can be made to self-adjust its own parameters to push itself out of a chaotic regime, as described by Hubler and Phelps in "Guiding a Self-Adjusting System through Chaos" in Complexity, Special Issue: Complex Systems Engineering, 13(2), 62-66, 2007, which is hereby incorporated by reference as though fully set forth herein. The theory shows that a system can perform this adaptation without any need for an explicit model of its own behavior. Instead, a low pass filtered signal of the system's output is used to adjust system parameters, as described by Melby et al. in "Dynamics of Self-Adjusting Systems with Noise" in Chaos, 15(3):33902, 2005, which is hereby incorporated by reference as though fully set forth herein. It has been shown that by merely linking the magnitude of this filtered signal to the magnitude of the adjustment, an unstable system will naturally drive itself into a stable mode. In the literature, this insight has been demonstrated only in a single-agent system with simplistic dynamics (e.g., the logistic map). In contrast, the present invention describes a process that will allow a more complex system of interacting agents to self-adjust towards stability.

The key elements of the present invention and the process flow are shown in FIG. 1. The process applies to a system of several components interacting with or acting on 101 a plant or an environment 100. The components may include, but are not limited to, agents 102, machines, and robots. For the purposes of this application, a plant is considered a factory, and an agent 102 is considered a computer program that performs various actions continuously and autonomously on behalf of an individual or an organization. As can be appreciated by one skilled in the art, a machine can also performs the actions of the agents 102, shown in FIG. 1, with assistance from of an appropriate electronic circuit or computer program.

Each agent 102 has its own controller 104, which directly controls 103 the actions of its corresponding agent 102. Additionally, each controller 104 receives feedback regarding its agent's 102 state (agent feedback 106) as well as feedback from the plant or environment 100 (plant/environment feedback 108). For the purposes of the present invention, state refers to a particular condition of the agent and/or environment/plant at a given time, non-limiting examples of which include velocity, position, temperature, and vibrations. As can be appreciated by one skilled in the art, sensors may be part of the agent 102 and/or the plant or environment 100 which provide feedback regarding the state of the agents and/or plant/environment 114.

At the heart of the invention is a regulatory system that adjusts control parameters 110 in the controllers 104 based on feedback regarding the stability of the plant or environment 100 and/or the agents 102. For instance the control parameter 110 may be an additional delay $\Delta_i$, which will be described in detail below. To measure this stability, a filter 112 evaluates the variance ($v_t$) or power of the system oscillations, which, in turn, are obtained through signals 111 regarding the state of the agents and/or plant 114, such as obtained from a sensor. In a desired aspect, the filter 112 output 113 (e.g., $v_t$) is used to adapt a global variable 116 (e.g., $d_t$) of a global regulator 118. The global variable 116 is then used to adapt each local regulator 120. The global variable 116 (or portion thereof) may be distributed homogeneously or heterogeneously among the agents 102 through the local regulators 120 and controllers 104.

As can be appreciated by one skilled in the art, the function of the regulator (global or local) can be carried out by a computer or electronic circuit. Additionally, an electronic circuit can carry out the functions of the filter and/or controller in the system. As a non-limiting example, a sensor measures vibrations (plant/environment feedback) from a plant and converts the vibrations into a voltage or current signal. In this example, the filter is an electronic box that converts this signal. The filter operations could be carried out using, for example, a set of operational amplifiers. Then, another electronic circuit uses this signal to modulate the global regulator, which is electronically connected to the local regulators. The local regulators then act on the controllers to control, for instance, individual machines in the plant.

Figure 2:
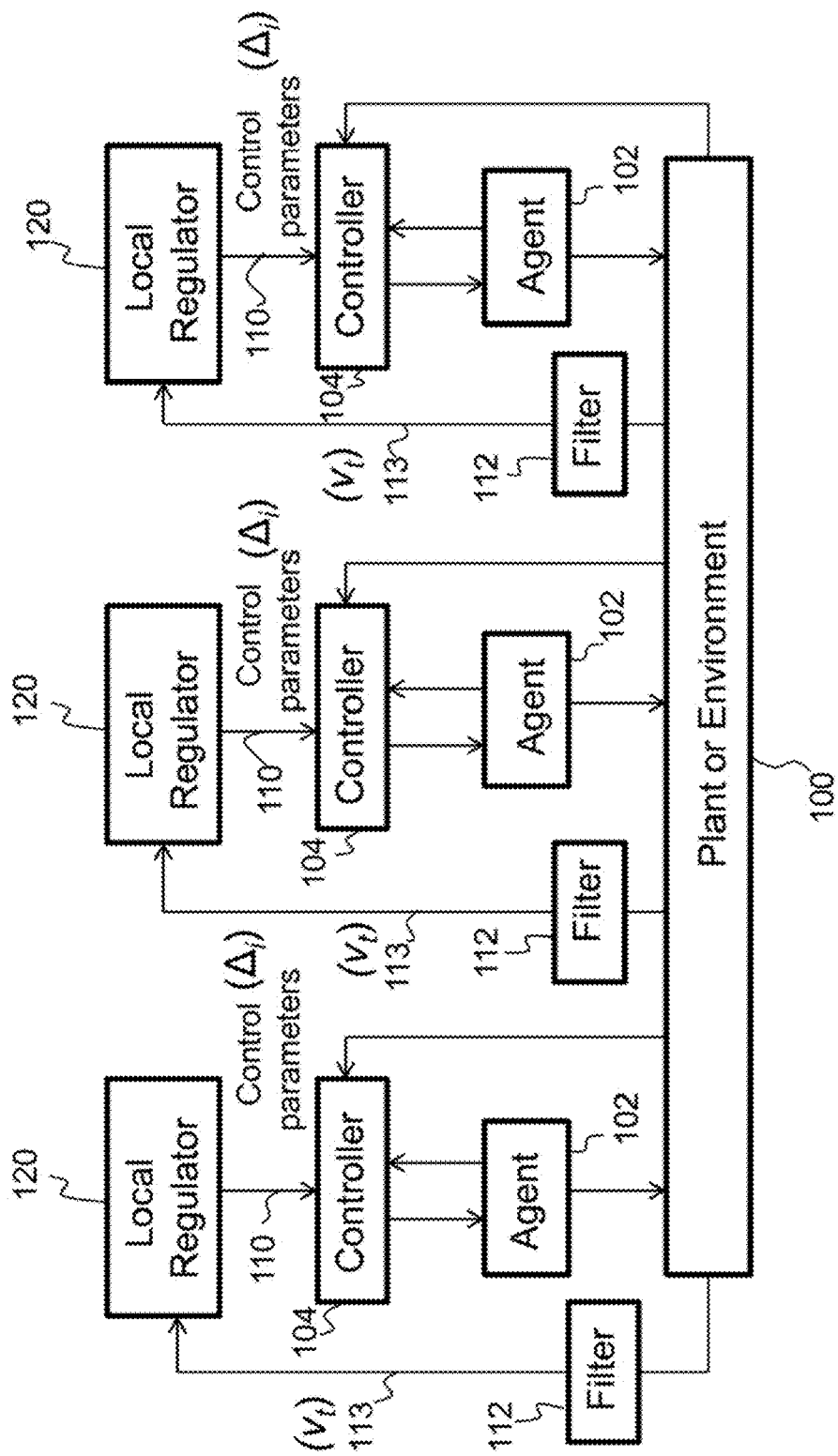
FIG. 2 is a flow diagram depicting a second embodiment of a control system for stabilizing a complex system through self-adjustment according to the present invention.

In another aspect, depicted in FIG. 2, each agent 102 has its own filter 112, whose output 113 directly regulates the local regulator 120 for each agent 102 and, thus, the control parameters 110, without going through a global variable. In this second case, control is completely local and no information needs to be exchanged between agents 102. Instead, the agents 102 adapt to each other based on interaction with a plant or the environment 100. A local variable similar to the global variable described herein can be used to adjust the control parameter (e.g., additional delay) in a manner similar to the global variable.

Referring to FIGS. 1 and 2, each agent 102 has a local regulator 120 to adjust at least one control parameter 110. Control parameters 110 have to be identified for each specific system. The insertion of additional feedback delays ($\Delta_i$) between a plant or environment 100 and each local controller 104 is a non-limiting example of a control parameter 110. These delays are added on top of the existing transmission delays. Thus, these delays are easy to regulate without changing an existing agent-controller system. In one aspect, the control parameter 110 (e.g., ($\Delta_i$) changes randomly with an amplitude proportional to the magnitude of the filtered signal (e.g., $v_t$) received from the filter 112. This version is desirable if it is unknown in which direction to change the control parameter 110 when instability occurs.

When combined with the self-regulation system described above, increasing delays of multiple interacting controllers allows controller instabilities to cancel each other out. The principal behind the canceling of instabilities is the negative interference of oscillations due to phase shifts caused by the additional delays. Here, for each agent, its additive delay is adjusted at a different rate such that, overall, all phase shifts can adjust to a uniform coverage of the phase space (0, $2\pi$), which is required for destructive interference. A non-limiting example of such a process is described below.

A test was performed to confirm and illustrate the function of the present invention. In a computer simulation, the setup consisted of a group of agents (robots) that pulled at a block in one dimension. Each agent was connected with a linear spring to the block. In this example, the block represents the plant/environment. This setup is analogous to a group of robots collaborating to carry a heavy object. In the setup, one agent, the leading robot, moved along a pre-defined path, and the goal was to control the other agents, such that the whole group followed the leader.

Figure 3:
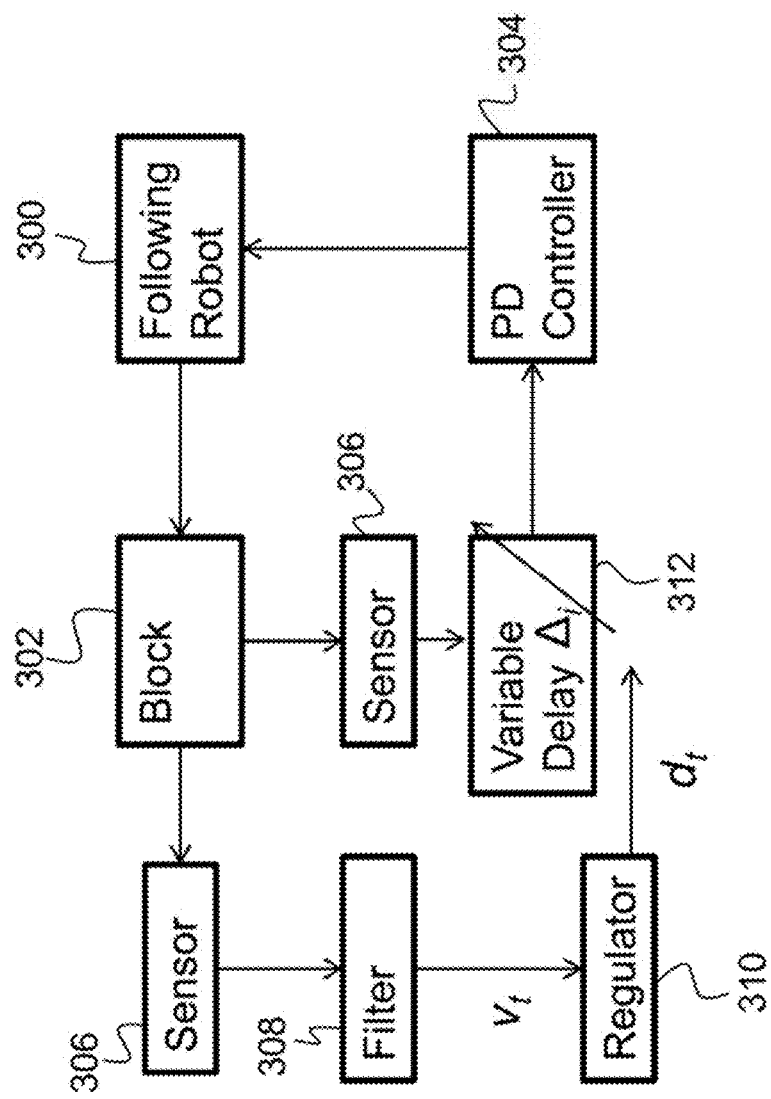
FIG. 3 is a flow diagram depicting a non-limiting example of a self-stabilizing system according to the present invention.

FIG. 3 is a diagram illustrating the control system for each following robot 300 in the simulation. As described above, a group of robots collaborate to carry a block 302. One robot leads, and its control is independent of the other robots. The other following robots 300 follow the position of the block 302. For each following robot 300, the controller is a proportional-derivative (PD) controller 304 that regulates acceleration of the following robot 300 such that, for instance, the following robot 300 keeps a desired distance from the block 302, as assessed by at least one sensor 306 connected with the block 302. As appreciated by one skilled in the art, there can be a shared sensor or separate sensors (as shown in FIG. 3). In this non-limiting example, the present invention comprises a regulator 310 that introduces additional variable delays 312 ($\Delta_i$) that act on the PD controller 304, which then controls the acceleration of the following robot 300. Thus, the delay 312 is variable such that it can be modified by the regulator 310. In other words, the regulator 310 automatically adjusts the amount of delay 312 based on feedback regarding the state of the agents/environment. FIG. 3 can be compared to FIG. 1, where the block 302 is the plant/environment (reference element 100 in FIG. 1), the following robot 300 is the agent (reference element 102 in FIG. 1), regulator 310 is the global regulator (reference element 118 in FIG. 1), the delay 312 represents the control parameter (reference element 110 in FIG. 1), and the PD controller 304 represents the controller (reference element 104 in FIG. 1). The delay 312 acts on the connection between the sensor 306 and the PD controller 304.

Figure 4B:
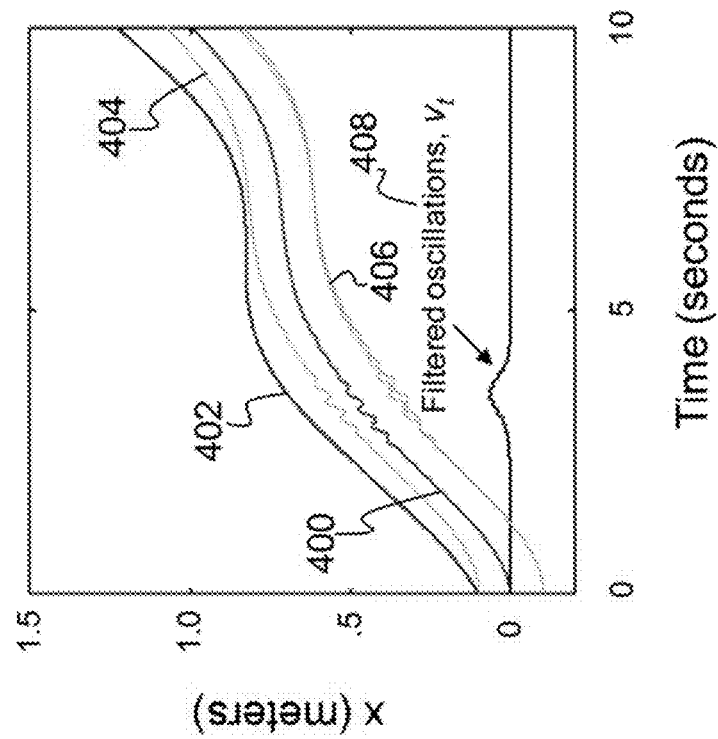
FIG. 4B is a graph depicting elimination of instability in the complex system after application of the present invention.
Figure 4A:
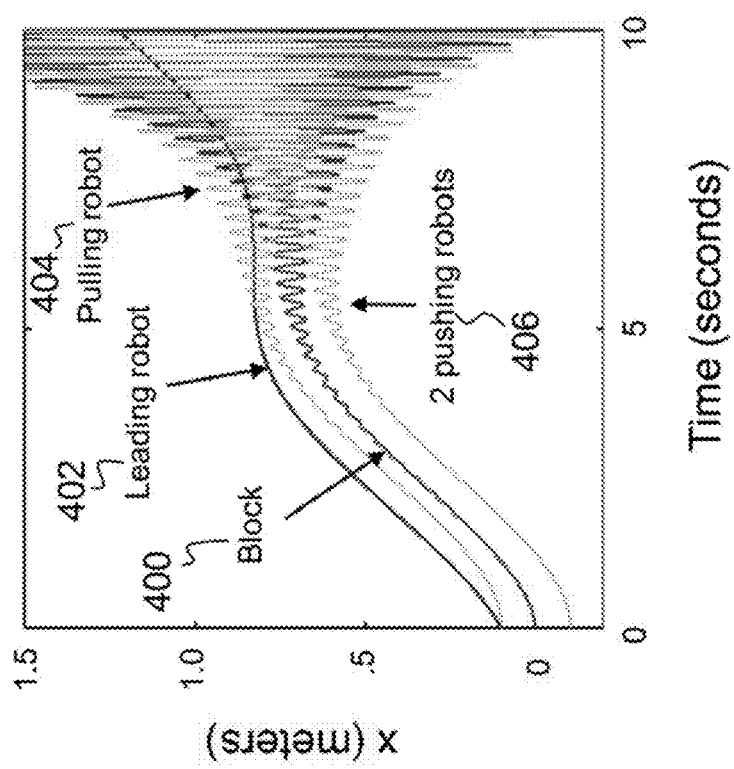
FIG. 4A is a graph depicting a computer simulation of an unstable complex system.

The results of the test are shown in FIGS. 4A and 4B. The test showed that the invention described herein can be remarkably effective at generating stability in systems of simple coupled controllers that would ordinarily be quite unstable without this type of self-compensation. As described above, the setup consisted of a group of agents (robots) that pulled at a block (i.e., point mass) in one dimension, x (meters). Each agent was connected with a linear spring to the block 400. The curves in the graphs represent the velocities of the block 400, the leading robot 402, 1 pulling robot 404, and 2 pushing robots 406. To control the following robots (i.e., 1 pulling robot and 2 pushing robots), a PD controller was used, which took as a desired state the measured velocity of the block 400. The PD controller regulates acceleration of the robot such that the robot keeps a desired distance from the block. The natural delay (for sensor processing) within this system may lead to oscillations and system breakdown. If the transmission of this measured velocity was without delay, the whole system was stable. With delay, however, the system became unstable as shown by the curves in FIG. 4A.

To avoid system breakdown in this example, a regulator was added, in accordance with the present invention, which introduced variable delays such that the oscillations cancelled each other out. In the results of the test of the present invention shown in FIG. 4B, the process depicted in FIG. 1 was constructed on top of the system of agents and their PD controllers. The block was the plant. Its velocity was the state sent to the filter, which computed the variance of this velocity over a time interval. Given this variance, $v_t$ 408, a regulator (e.g., global/local regulator) adjusted a global variable $d_t$ according to the following equation:

$$d_{t+1} = \exp(-av_t)d_t + bv_t,$$

where a and b are constants, and exp denotes the exponential function. $d_{t+1}$ is the update for time step t+1 of $d_t$ based on the value of $d_t$ at time t. According to this equation, the global variable $d_t$ increases in the presence of instability (i.e., large $v_t$). To avoid that the global variable $d_t$ grows unbounded during prolonged instability, the above equation contains an exponential term that stabilizes $d_t$.

This global variable then regulates the local control parameters. As control parameters, additional delays were introduced in the transmission of the block velocity to the agents. If each controller is labeled with an index i, then each controller's additional delay $\Delta_i$ was linked to the global variable as follows:

$$\Delta_i = id_t.$$

The multiplication by the index i resulted in a homogenous distribution of delays. Here, all agents were equal. A heterogeneous set of agents would require a more heterogeneous distribution of delays.

Referring back to FIG. 4B, when the system started to become unstable, the oscillation was measured in the variance $v_t$ 408. This variable then drove the global variable $d_t$ until the resulting set of delays $\Delta_i$ made the oscillation disappear. Once the oscillation disappeared, the global variable no longer changed, and the system as a whole was stable. The result of this stabilization is shown in FIG. 4B, where all of the curves 400, 402, 404, and 406 stabilized.

Figure 5:
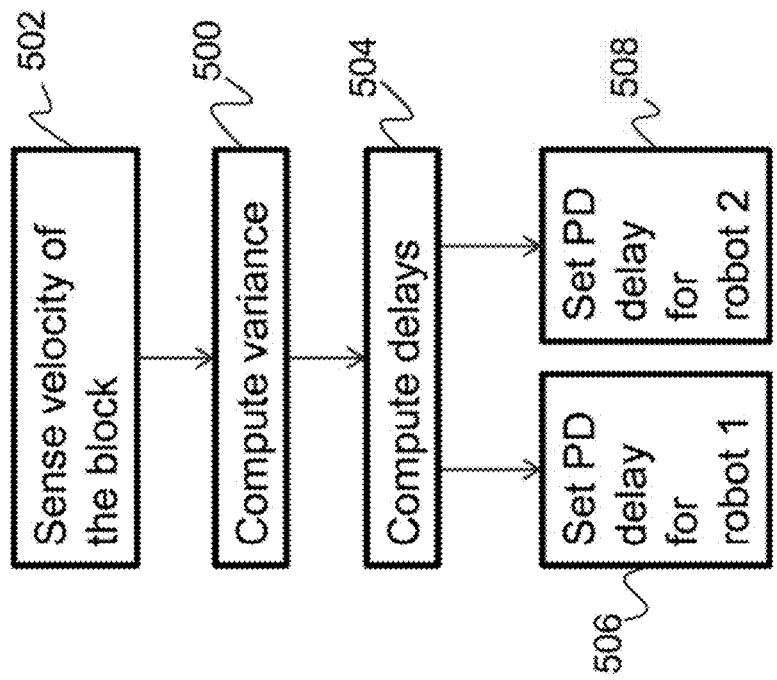
FIG. 5 is a flow diagram depicting the process of setting additional delays as a control parameter according to the present invention.

FIG. 5 is a diagram that uses the test example above to illustrate the process of setting the additional delays. In order to automatically introduce delays, the regulator has to compute the correct amount of extra delays. First, the filter computes the variance 500 of the block's velocity over a time window that ends at a currently sensed velocity of the block 502. Based on the computed variance 500, a global variable is modulated. The global variable increases for a large variance and stabilizes if the variance decreases again. Based on the global variable, the system (i.e., regulator) computes extra delays 504 for each following robot, which are proportional to the global variable multiplied by an index for each robot, as described above. For instance, as shown in FIG. 5, the system (specifically, the global regulator) sets a PD controller delay for robot 1 506, and separately sets a PD controller delay for robot 2 508. In this example, each robot has a different index ranging from 0 to n−1, where n is the number of following robots. As a result, the system drives itself automatically away from oscillations (i.e., high variance).

Alternatively, this test could be performed with local regulators for each robot, which is comparable to the system diagrammed in FIG. 2. In that situation, there is not a global variable. Rather, the additional delays (FIG. 2, control parameters 110) for each robot (FIG. 2, agent 102) are computed based on the locally sensed velocity of the block (FIG. 2, plant or environment 100).

Figure 6:
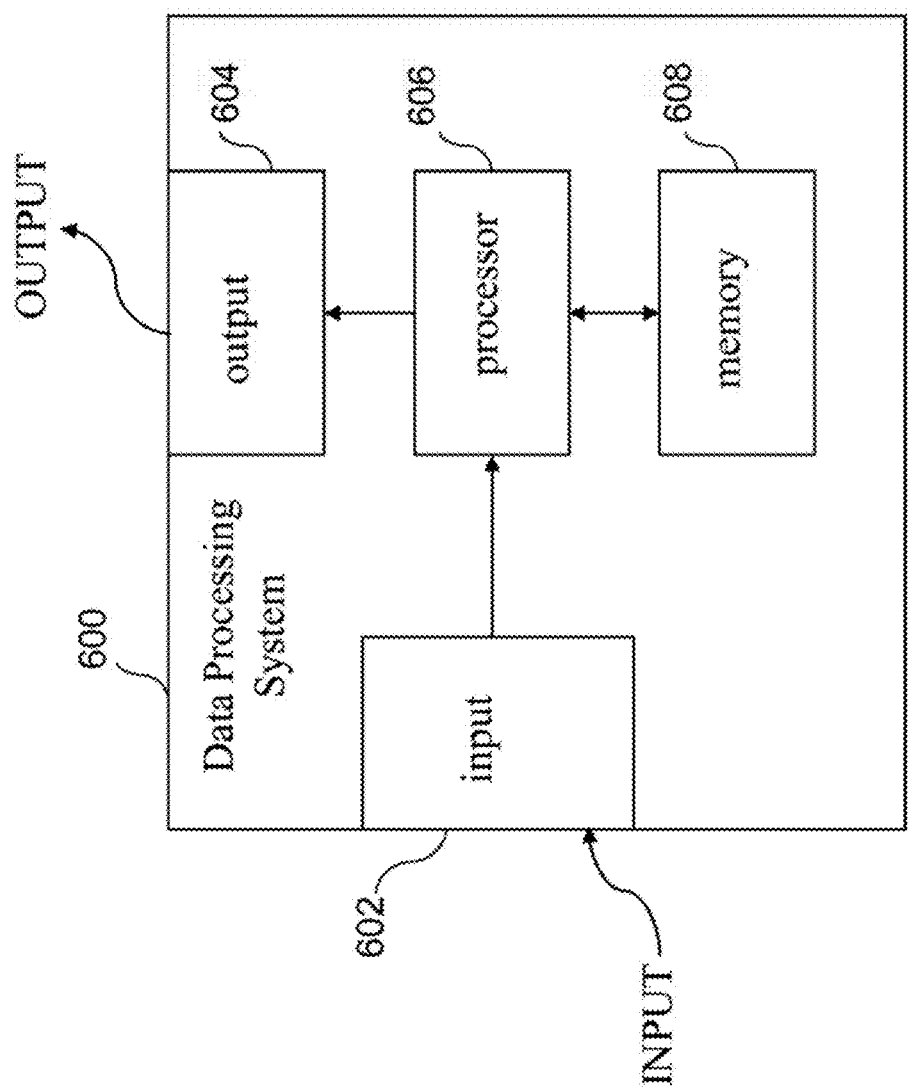
FIG. 6 is an illustration of a data processing system according to the present invention.

FIG. 6 illustrates a block diagram depicting components of a data processing system 600 (e.g., computer) incorporating the operations of the method described above and throughout the specification. The method utilizes a data processing system 600 for storing computer executable instructions (or instruction means) for causing a processor to carry out the operations of the above described method. The data processing system 600 comprises an input 602 for receiving information from a user. Information received may include input from devices such as cameras, scanners, keypads, keyboards, microphone, other peripherals such as storage devices, other programs, etc. The input 602 may include multiple "ports." An output 604 is connected with a processor 606 (or processors) for providing information for transmission to other data processing systems, to storage devices, to display devices such as monitors, to generating information necessary for delivery, and to other mechanisms for presentation in user-usable forms. The input 602 and the output 604 are both coupled with the processor 606, which may be a general-purpose computer processor or a specialized processor designed specifically for use with the present invention. The processor 606 is coupled with a memory 608 to permit storage of data and software to be manipulated by commands to the processor 606. The memory 608 includes instructions such that when the instructions are executed, the processor 608 (or processors) performs operations described above and throughout the specification.

Figure 7:
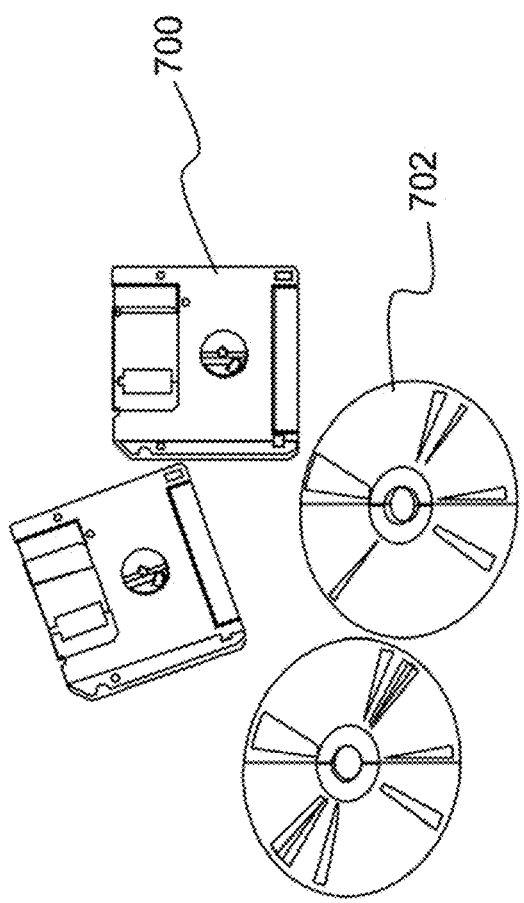
FIG. 7 is an illustration of a computer program product according to the present invention.

An illustrative diagram of a computer program product embodying the present invention is depicted in FIG. 7. As a non-limiting example, the computer program product is depicted as either a floppy disk 700 or an optical disk 702. However, as mentioned previously, the computer program

What is claimed is:

1. A control system for stabilizing complex systems, wherein the complex system comprises a plurality of agents or machines interacting with an environment, the control system comprising:
   at least one sensor, connected with each agent or machine and the environment, configured to measure a state of the complex system and output the measured state of the complex system;
   a plurality of controllers, each agent or machine having its own controller which directly controls the actions of its corresponding agent or machine,
   wherein each controller receives feedback regarding its corresponding agent's or machine's state as well as feedback from the environment; and
   at least one filter configured to receive the measured state of the complex system, compute a variance in the oscillations of the complex system over time, and output the computed variance to at least one regulator;
   wherein for each agent or machine, at least one corresponding regulator is connected with the controller corresponding to the agent or machine and is configured to automatically adjust a control parameter in response to the computed variance received from the at least one filter;
   wherein the automatically adjustable control parameter is at least one additional feedback delay between the measured state of the complex system and each controller corresponding to an agent or machine; and
   wherein each regulator is configured to regulate each controller's action on its corresponding agent or machine based on the control parameter in order to maintain stability of the complex system.

2. The control system for stabilizing complex systems as set forth in claim 1, wherein the at least one regulator comprises a global regulator and a plurality of local regulators regulated through the global regulator, wherein the global regulator adjusts a global variable $d_t$ according to the following:

$$d_{t+1}=\exp(-av_t)d_t+bv_t,$$

where a and b are constants, $v_t$ represents the computed variance, and exp denotes an exponential term that stabilizes $d_t$.

3. The control system for stabilizing complex systems as set forth in claim 2, wherein the global variable regulates the control parameter according to the following:

$$\Delta_i = id_t,$$

wherein i is an index that labels each controller.

4. The control system for stabilizing complex systems as set forth in claim 1, wherein the control parameter changes randomly with an amplitude that is proportional to the computed variance.

5. The control system for stabilizing complex systems as set forth in claim 1, wherein the at least one regulator is a plurality of local regulators, each connected with a controller for controlling each agent or machine, and wherein the at least one filter comprises a plurality of filters, wherein each filter is configured to output the computed variance to each local regulator.

6. A method for stabilizing complex systems, wherein the complex system comprises a plurality of agents or machines interacting with an environment, the control system comprising:
   at least one sensor, connected with each agent or machine and the environment, configured to measure a state of the complex system and output the measured state of the complex system;
   a plurality of controllers, each agent or machine having its own controller which directly controls the actions of its corresponding agent or machine,
   wherein each controller receives feedback regarding its corresponding agent's or machine's state as well as feedback from the environment; and
   at least one filter configured to receive the measured state of the complex system, compute a variance in the oscillations of the complex system over time, and output the computed variance to at least one regulator;
   wherein for each agent or machine, at least one corresponding regulator is connected with the controller corresponding to the agent or machine and is configured to automatically adjust a control parameter in response to the computed variance received from the at least one filter;
   wherein the automatically adjustable control parameter is at least one additional feedback delay between the measured state of the complex system and each controller corresponding to an agent or machine; and
   wherein each regulator is configured to regulate each controller's action on its corresponding agent or machine based on the control parameter in order to maintain stability of the complex system.

7. The method for stabilizing complex systems as set forth in claim 6, wherein the at least one regulator comprises a global regulator and a plurality of local regulators regulated through the global regulator, and wherein the method further comprises an act of adjusting a global variable $d_t$ according to the following:

$$d_{t+1}=\exp(-av_t)d_t+bv_t,$$

where a and b are constants, $v_t$ represents the computed variance, and exp denotes an exponential term that stabilizes $d_t$.

8. The method for stabilizing complex systems as set forth in claim 7, further comprising an act of regulating the control parameter according to the following:

$$\Delta_i = id_t,$$

wherein i is an index that labels each controller.

9. The method for stabilizing complex systems as set forth in claim 6, wherein the at least one regulator is a plurality of local regulators, each connected with a controller for controlling each agent or machine, and wherein the at least one filter comprises a plurality of filters, wherein each filter is configured to output the computed variance to each local regulator.

10. The method for stabilizing complex systems as set forth in claim 6, further comprising an act of changing the control parameter randomly with an amplitude that is proportional to the computed variance.

11. A computer program product for stabilizing complex systems, wherein the complex system comprises a plurality of agents or machines interacting with an environment, the control system comprising:

at least one sensor, connected with each agent or machine and the environment, configured to measure a state of the complex system and output the measured state of the complex system;

a plurality of controllers, each agent or machine having its own controller which directly controls the actions of its corresponding agent or machine, wherein each controller receives feedback regarding its corresponding agent's or machine's state as well as feedback from the environment; and at least one filter configured to receive the measured state of the complex system, compute a variance in the oscillations of the complex system over time, and output the computed variance to at least one regulator;

wherein for each agent or machine, at least one corresponding regulator is connected with the controller corresponding to the agent or machine and is configured to automatically adjust a control parameter in response to the computed variance received from the at least one filter;

wherein the automatically adjustable control parameter is at least one additional feedback delay between the measured state of the complex system and each controller corresponding to an agent or machine; and wherein each regulator is configured to regulate each controller's action on its corresponding agent or machine based on the control parameter in order to maintain stability of the complex system.

12. The computer program product for stabilizing complex systems as set forth in claim 11, wherein the at least one regulator comprises a global regulator and a plurality of local regulators regulated through the global regulator, further comprising instruction means for adjusting a global variable $d_t$ according to the following:

$$d_{t+1} = \exp(-av_t)d_t + bv_t,$$

where a and b are constants, $v_t$ represents the computed variance, and exp denotes an exponential term that stabilizes $d_t$.

13. The computer program product for stabilizing complex systems as set forth in claim 12, further comprising instruction means for regulating the control parameter according to the following:

$$\Delta_i = id_t,$$

wherein i is an index that labels each controller.

14. The computer program product for stabilizing complex system as set forth in claim 11, further comprising instruction means for changing the control parameter randomly with an amplitude that is proportional to the computed variance.

15. The computer program product for stabilizing complex system as set forth in claim 11, wherein the at least one regulator is a plurality of local regulators, each connected with a controller for controlling each agent or machine, and wherein the at least one filter comprises a plurality of filters, wherein each filter is configured to output the computed variance to each local regulator.

* * * * *